United States Patent Office 3,297,466
Patented Jan. 10, 1967

3,297,466
CONTINUOUS PROCESS FOR ENCAPSULATING INDIVIDUAL PARTICLES OF PARTICULATE MATERIAL WITH A POLYOLEFIN
Daniel F. Herman, Princeton, and Uno Kruse, Neptune, N.J., assignors to National Lead Company, New York, N.Y., a corporation of New Jersey
Filed Nov. 1, 1962, Ser. No. 234,625
14 Claims. (Cl. 117—47)

This invention relates to a continuous process for polymerizing 1-olefins directly onto the surfaces of particulate materials. More particularly, the invention is concerned with a simple, inexpensive and continuous process for treating particles or fibers of cellulosic materials, carbon, metals, silicates, asbestos, proteins, and similar particulate materials, with ethylenically unsaturated hydrocarbon monomers to form a polymer shell or tube on each individual particle or fiber.

In copending U.S. applications Serial No. 852,844, filed November 13, 1959, now Patent No. 3,121,698; Serial No. 18,483, filed March 30, 1960; now Patent No. 3,256,236; Serial No. 58,169, filed September 16, 1960; and Serial No. 131,928, filed August 16, 1961; there are shown various processes for encasing individual particles of particulate or filamentary materials in a shell, sleeve or tube of polymer by treating the material in a particular manner. Also described in such applications are the products produced by such processes.

The processes of the aforementioned applications are carried out with a multi-component catalyst system the components of which, when reacted with each other, produce a substance or substances highly active as a polymerization initiator for lower aliphatic 1-olefins. The preferred catalyst system for carrying out the process is what is generally known as an organometallic-transition metal catalyst system.

After the material has been treated with the components of the multi-component catalyst system the monomer may be added and polymerized in situ on the individual particles or filaments. The polymer forms as a shell or tube which encases and tenaciously adheres to each individual particle. There is little, if any, agglomerating or interconnecting of the particles by the polymer.

The particles of the particulate material form a nucleus or substrate for the polymer. The amount of polymer formed on the particles in the processes of the aforementioned applications varies with the time and conditions of the polymerization reaction, the catalyst system employed and the particular monomer or monomers polymerized. Useful products are obtained by forming a total amount of polymer on the particulate material in an amount from about 1% of the weight of the particulate material to amounts of polymer greater than the weight of the particulate material. The use to which the material is to be put will, to some extent, dictate the amount of polymer which should be formed.

As is pointed out in the aforementioned applications, it is important to conduct the process under substantially oxygen-free and anhydrous conditions since the activity of the catalyst system is impaired by the presence of any substantial amount of oxygen or water. With some materials, however, it is not necessary to remove all moisture. For example, when treating cellulose fibers and similar materials, up to 1% of moisture may be retained within the material without interfering with the reaction.

Under the instant invention, the processes of the aforementioned applications are carried out in a continuous stream. In other words, the particulate or fibrous material to be treated or encased is fed into one end of a continuously flowing reaction stream. As the material is fed through the stream, it is treated with the components of the catalyst system and the monomer and is withdrawn or discharged at the other end of the continuous stream with the particles encased individually in a shell or tube of polymer.

It is an object of the present invention to provide a continuous process whereby small particles or fibers of solid material may be easily and inexpensively encased individually in tubes, sleeves or shells of a polyolefin plastic.

It is a further object of this invention to provide a continuous process wherein particulate substrate materials are conveyed to successive steps of the process by a non-reactive conveying fluid which is easily separable from the product at the completion of the process.

Still a further object of this invention is to provide a continuous process wherein the particulate material is passed through a plurality of polymerization reactors arranged in series whereby as the material passes progressively through the reactors additional amounts of polymer are successively polymerized on the material.

A still further object is to provide such a process wherein the final product is produced in a dry state. Further objects will be described or will become apparent from the following description.

Figure 1:
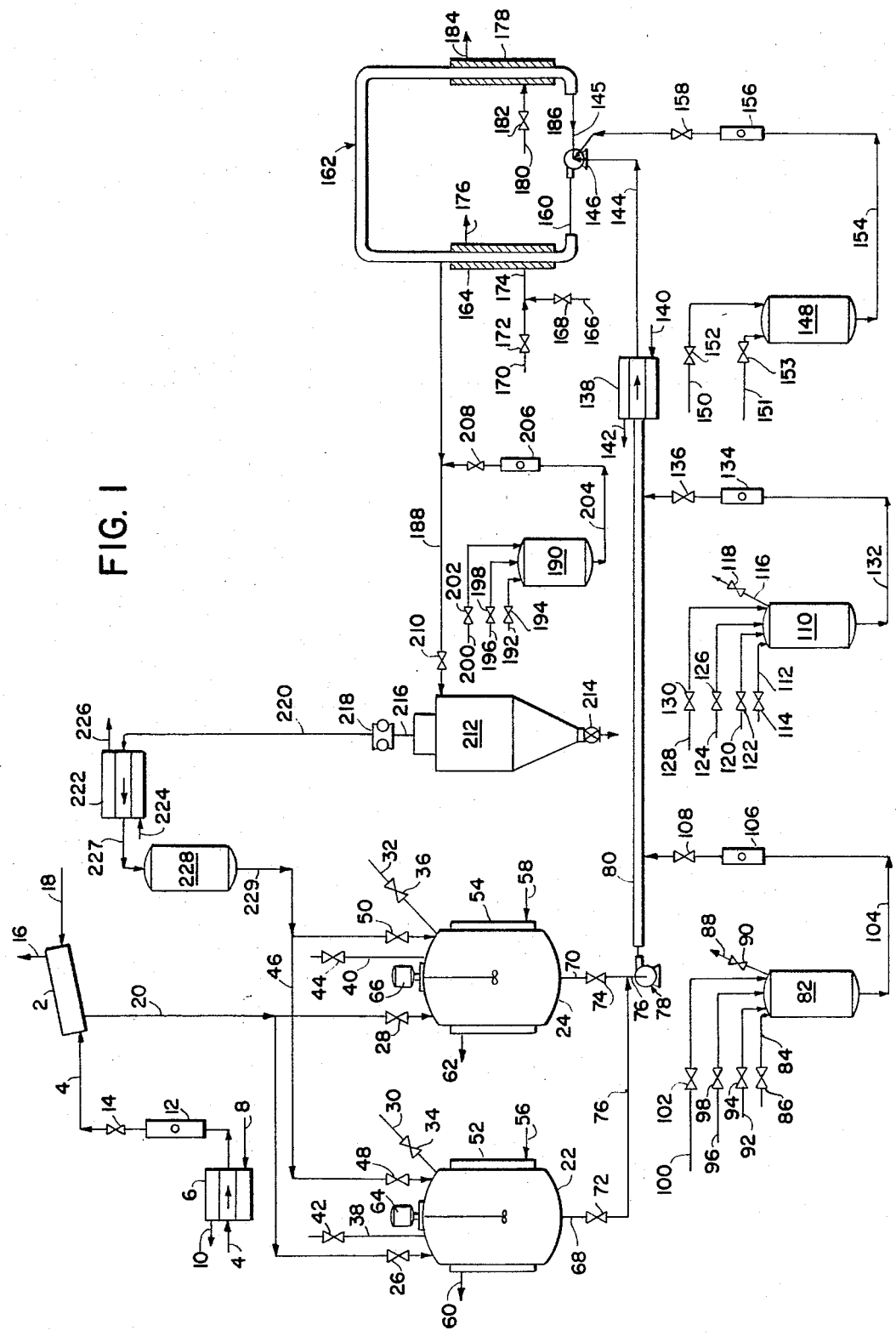
FIG. 1 is a flow diagram of a process embodying the present invention and utilizing a conveying fluid which is a gas at ordinary pressures and temperatures.

As can be seen from the flow diagram of FIG. 1, the continuous process of the instant invention consists in a number of treatment steps arranged sequentially and the particulate material under treatment is fed in a continuous stream through the steps. For purposes of convenience the treatment steps may be identified as follows: Preconditioning or drying the particulate material; slurrying the dried material in a conveying fluid; metering the slurry into a catalyst addition header; adding a first catalyst component to the slurry to treat the particulate material; adding a second catalyst component to react with the first catalyst component to form polymerization initiator sites on the particulate material; heating the catalyst treated slurry to optimum reaction temperature; adding a 1-olefin to the heated slurry and polymerizing the 1-olefin on the particles of the catalyst treated particulate material in a reaction zone; neutralizing the catalyst; recovering the polymer encased particulate material by vaporizing the conveying fluid or by other solvent separation means, such as filtering or steam stripping; and, reliquefying the conveying fluid to recycle the fluid for reuse in the initial slurrying step.

The particulate material to be encased in a shell or tube of the polymer in the instant process may be in the form of a fine powder as small as 1 micron or smaller in size, or in the form of fibers ranging generally from 30 microns to 8,000 microns in length and from about 7 to 55 microns in diameter. Any particulate solid material that is compatible with the catalyst system, the conveying fluid medium, the monomer and the polymer may be used in the instant process. Such materials include cellulose materials, wool, silk, asbestos, carbon, metals, silicates, glass fibers, synthetic fibers and other particulate materials such as, ceramics, pigments, oxides, and the like. When treated in accordance with the instant process, the individual particles or fibers are substantially encased in individual shells of the polymer without appreciable agglomeration of the particles or fibers during treatment and polymerization. The tubes or sleeves of polymer which encase the particles or fibers may range anywhere up to 60 microns or more in wall thickness. The product withdrawn at the end of the polymerization reaction is composed of particles or fibers proportional to the size of the material originally fed into the process, and is free-flowing. The product, to the extent it can be determined, has the properties of and is identical to the materials disclosed and described in the aforementioned applications.

Before feeding the particulate material into the continuously flowing reaction stream, the material is preconditioned, or dried, to remove excess moisture and to render the material satisfactory for treatment and to aid good catalyst efficiency. Drying may be accomplished by charging the particulate material into a rotary kiln-type dryer and sweeing the material with a current of dry air or other gas. The rotary kiln-type dryer may be of either the well known single shell or multi-shell type. Preferably, the multi-shell type, having a round, cylindrical shell containing two concentric, internal cylinders, is employed. In the latter type of dryer, the particulate material is conveyed back and forth through successive cylinders in the dryer, continuously falling through a countercurrent flow of hot, dry gas which removes the moisture. Drying temperature will depend upon the particulate material. With most materials temperatures up to 120° C. may be employed. The drying time will be governed by the requirements to dry the material and may extend as long as two and one-half hours using conventional rotary kiln-type dryers. In some instances it may be preferred to flash dry the material over a shorter period of time. Where flash drying procedures are employed, drying temperatures as high as 450–500° F. may be employed. However, when following this technique care must be exercised to avoid damage to the material.

It is preferred to employ nitrogen as the drying gas. Prepurified, oil-pumped, nitrogen having a purity of 99.9% and a moisture content of less than thirty parts per million cubic feet has been found to be acceptable. Before passing across the particulate material the nitrogen is preferably heated by passing it through a heater heated by conventional means such as by a steam jacket, electric coil or direct flame. Ordinarily, the heated nitrogen is introduced at the material outlet of the dryer and is allowed to flow up through the particulate material, absorbing moisture from the material as the material and nitrogen counterflow through the dryer, the moisture-laden nitrogen exhausting through the material inlet opening of the dryer. Any gas which is non-reactive with the particulate material may be substituted for nitrogen for drying purposes. For instance, in drying cellulose hot, dry air may be used.

In the apparatus illustrated diagrammatically in FIG. 1, dryer 2 is purged with a stream of hot, dry nitrogen, admitted through nitrogen supply conduit 4. The nitrogen passes through a heater 6, heated by steam or other heating medium introduced into the heater through inlet 8 and discharged from the heater through outlet 10. From the heater the heated nitrogen passes through a flow indicator 12, which may be a rotameter. The flow of the hot nitrogen gas through flow indicator 12 is controlled by regulating valve 14. The nitrogen is discharged from the dryer through outlet 16. With the dryer purged, the particulate material to be treated is introduced into the dryer through charging spout 18. The dryer is rotated, and the material is tumbled and dried by the counterflow current of hot, dry nitrogen gas.

Alternate means for drying, or preconditioning, the substrate material may be substituted. For example, a continuous, pneumatic conveying, drying system wherein the undried particulate material is dispersed in a stream of hot, dry gas or air and carried by the gas or air through a duct system of extended length to a collector might be employed. During travel through the duct system, which may be up to 250 feet in length, the moisture content of the particulate material is reduced to the required level. At the end of the duct, the material may be collected in a cyclone separator in a dry form suitable for subsequent treatment. From the cyclone separator the dried material may be discharged into the slurry vessel by suitable means, for instance, a rotary vane feeder.

Rather than drying the substrate material separately, and subsequently adding the dried substrate to a liquid medium to form a slurry for circulation, the particulate, substrate material may be added to the liquid slurrying medium and azeotroped. For reasons which will be more apparent hereinafter, it is preferred to dry the particulate material in an air or a gas stream before the slurry is formed, rather than follow the azeotroping method. No matter which technique is employed, care must be exercised to assure that the material is sufficiently dried before it is passed into the following portions of the system.

Where the particles are air-dried, after drying they are slurried into a flowable slurry with a liquid medium. Preferably, the liquid medium should be a fluid which is easily vaporized and compatible with the particulate material, the catalyst components, the monomer and the polymer and which will not react chemically in the reaction. A conveying fluid which is a gas at ordinary pressures and temperatures and which is easily liquefied at relatively low temperatures or moderate pressures or combinations thereof, is particularly suitable. Propane and butane are typical of this type of fluid. Other fluid materials, such as toluene, which is liquid at ordinary room temperatures but which vaporizes readily at moderately elevated temperatures, may also be employed. Toluene is particularly adapted for use where it is desired to employ the azeotroping technique for drying the particles.

The slurry is formed with the conveying fluid in its liquid phase, and the liquid slurry is flowed through the various treatment zones. After treatment has been completed and the particles of the particulate material are individually encased in a shell or sleeve of polymer, the conveying fluid is vaporized, separating the conveying fluid and the polymer encased particles. The vaporized conveying fluid may be recovered, reliquefied and reused for subsequent slurrying purposes.

One purpose of the slurrying step is to disperse the particulate material in the conveying fluid so that it can be easily transported. Control of the concentration of the slurry is required in order to obtain an easily pumpable fluid. The concentration is selected so that the final composition of encapsulated material in the conveying fluid after completion of the reaction is of the order of 10% product by weight of the circulating slurry. The 10% concentration is an easily pumpable slurry; above the 10% level the slurries tend to become more viscous and reach a maximum pumpable viscosity at about the 15% solids level.

Low concentrations of the particulate material in the initially formed slurry are preferably employed when an encapsulated product is being made which will contain large amounts of polymer, for instance within the range of 90 to 95% polymer by weight. Where such large amounts of polymer are to be formed on, for example, cellulose fibers, a concentration of 1% by weight of the cellulose fibers in the initially formed slurry provides a concentration in the slurry after the polymer is formed of approximately 10%. Thus, throughout the treatment, the slurry concentration remains pumpable. At higher concentrations, that is, concentrations substantially in excess of 10%, there is a tendency for fibers to be deposited at bends in the piping, on the entrance side of valves and, in general, at any place where there is a restriction to the flow. Such deposition eventually clogs valves and plugs lines and should be avoided.

In the case of the polymerization of extremely long fibers, it is well to operate at the lower end of the concentration range in order to prevent entanglement of fibers. For instance, the range of concentration by weight of long fibers of cellulose in propane most suitable for pumping is from ½ to 5 percent.

The slurry vessel may consist of a stainless steel tank constructed to have an operating pressure equal to the vapor pressure of the circulating fluid at the operating temperatures. Where propane is used as the circulating fluid the vessel must have an operating pressure of about 600 p.s.i.g. The vessel may be provided with an agitator and a cooling jacket and with other devices as dictated by good engineering practice.

The slurry vessel may be fitted with a connection by which dry nitrogen may be charged into the vessel prior to the initial filling of the vessel, thus assuring that the interior of the vessel is thoroughly dried and that oxygen is excluded prior to the start of the continuous slurrying operation. It is important throughout the process that moisture and oxygen be removed before any of the reacting slurries or fluids are introduced into the apparatus. Also, for efficient operation, moisture and oxygen must be excluded throughout the system during the operation to prevent deactivating or poisoning the catalyst.

The vessel may be provided with interior baffles to aid in agitation where this is required. It is preferred, however, that the internal baffling be eliminated to avoid having internal surfaces on which fibers and particles may settle out of the slurry. For the same reason a jacket rather than an internal coil is preferred for cooling purposes. A cooling medium such as water or a conventional refrigerant may be circulated through the slurry vessel jacket in order to facilitate the introduction of liquefied gases into the vessel. This is particularly desirable on the initial start-up of the system.

Where the dried particulate material is transferred by gravity to the slurry vessel, two or more slurry vessels are required for continuous operation. The slurry vessel must be at essentially atmospheric pressure for the transfer to take place efficiently, but in the subsequent operation the slurry vessel is under elevated pressures, for instance up to 600 p.s.i. where propane is the circulating conveying medium. Thus the vessel must be out of operation during transfer. Using two slurry vessels, one vessel may be in operation while the other is receiving dried material. The material may be dried at atmospheric pressure in a rotary kiln feeding alternatively one of two or more large capacity storage tanks. In operation, one storage tank is pressurized and the dried material transferred to the slurry tank. One storage tank can be filled as the other is being emptied.

The continuous pneumatic conveying system of drying described above is suitable for use in a single slurry vessel process. It is preferred however, to use two or more slurry vessels for flexibility in operation. In the operation of the two-vessel system, one slurry vessel is on stream while the other is being charged with the dried particulate material and the liquid conveying fluid. To charge the vessel, the line connecting the discharge of the dryer with the inlet of the vessel is opened and the dried material flows in by gravity or by pneumatic or mechanical conveying means. When a predetermined amount of dried material has been charged into the vessel, a predetermined amount of conveying fluid may be added. It has been found convenient to cool the slurry vessel with a liquid coolant circulating through its jacket during the conveying fluid addition. The cooling of the vessel has been found to be particularly helpful in the addition of the conveying medium where materials such as propane are used as the conveying fluid. The material may be maintained in dispersed condition by agitating throughout the standby period. The switch-over from standby to operation may be carried out by opening the outlet valve on the vessel to be brought on stream. The other vessel may be removed from the stream by closing the outlet valve. The pressure in the vessel removed from the line may be vented and a stream of propane or other suitable dry gas introduced into the vessel so that a dry atmosphere fills the vessel when not in use. Such a slurrying system is shown in FIG. 1.

As shown in FIG. 1, when the particulate material is dry, it is discharged through conduit 20 into one of the slurry vessels 22 or 24. Two slurry vessels are provided so that one may be in operation while the other is being charged. Where two numerals are used to identify apparatus in the following description, it is to be understood that they are to be used alternatively, depending on the selection for charging of the slurry vessel with which they are associated. The selection of the slurry vessel to be charged is made by opening one of the inlet valves 26, 28. Before the dry material is charged into the slurry vessel, the slurry vessel must preferably first be purged with a stream of dry nitrogen. The nitrogen enters through nitrogen inlet 30, 32, the flow being controlled by valve 34, 36. The purged nitrogen exists through vent conduit 38, 40 as controlled by nitrogen vent valve 42, 44.

A stream of liquid conveying fluid is drawn from conveying fluid header 46. The conveying fluid is introduced into the slurry vessel 22, 24 to be charged through inlet valve 48, 50. A cooling fluid is introduced into the cooling jacket 52, 54 through cooling fluid inlet 56, 58 and leaves the cooling jacket through cooling fluid outlet 60, 62. Agitator 64, 66 is started when a sufficient level of conveying fluid has entered the slurry vessel and thoroughly disperses the dry, particulate material in the conveying fluid.

Using a single slurry vessel and a plurality of storage vessels, as described above, the liquid conveying fluid and the dry, particulate material may be charged into the vessel at the same rate at which the slurry is withdrawn. Thus, a particular level is maintained within the vessel, which level is from ⅔ to ¾ of the full capacity of the vessel. The level may be manually or automatically controlled by varying the make-up liquid conveying fluid. The dried material from the drier may be metered into the slurry vessel at a continuous rate by inlet valves 26, 28. The rate of particulate material feed is preferably proportional to the flow rate of make-up conveying fluid in order that the desired compositions of the slurry may be maintained. This may be done manually or automatically by suitable instrumentation and valving. The slurry may be agitated to obtain the optimum dispersion and separation of the particulate materials. The holding time in the slurry vessel may be maintained sufficient to obtain the desired thorough dispension of the dry material in the liquid conveying fluid.

The slurry containing the dried particulate material may be discharged from the slurry vessel through a suitable metering device into the catalyst addition header. It is preferable to regulate the slurry flow by means of a metering pump. Where the pressure in the slurry vessel is sufficiently high, a liquid flow meter of known type may be employed as the metering device. For instance, where propane is used as the conveying medium, the metering device may be a diaphragm control valve of the type having no sharp restrictions to the throughflow of material.

As shown in FIG. 1, when the dry material is thoroughly dispersed in the liquid conveying fluid, the slurry is withdrawn from the slurry vessel through slurry discharge conduit 68, 70 by opening discharge valve 72, 74. The material flows through slurry header conduit 76 to slurry metering pump 78. The metering pump discharges a controlled amount of slurry into catalyst addition header 80.

The process utilizes the two-component catalyst system of the aforementioned applications. The particulate material is preferably treated with the first catalyst in order to establish sites for subsequent polymerization. The second catalyst is preferably added after the first catalyst has had an opportunity to fully treat the particulate material. After the two catalysts have treated the particulate material, the addition of a 1-olefin monomer will result in the formation of polymer on the individual particles of the material.

A convenient means of regulating the successive catalyst additions as to time has been found to lie in the use of spaced injection points in a suitable sized header. The header is preferably sized so that a turbulent flow of the slurry may be maintained in the header. The turbulence prevents the substrate material from settling out of the slurry and also aids in the thoroughly dispersion of the catalyst throughout the slurry. The length of header between the point of addition of the first catalyst and the point of addition of the second catalyst provides a direct control on the length of time, for a predetermined flow rate, that the first catalyst may treat the substrate material before the addition of the second catalyst. After the addition of the second catalyst, the catalyst addition header provides a further container for the material during the time of treating the substrate material with the second catalyst. Treatment time may also be controlled by providing enlarged sections of piping or closed vessels in the line at a point in the flow path down-stream from the point of addition of the individual catalysts.

Any of the catalyst systems which are useful in the processes of the aforementioned applications may be employed in the instant process. Such catalyst systems include any two or more component systems which, when mixed together, react to form a material that initiates the polymerization of the 1-olefins, and which have at least one component that reacts with or becomes fixed in some way on the particulate material being treated when brought into contact therewith. In general, two component systems which are particularly suitable are those in which one component is an organometallic reactant, such as an alkyl or aryl derivative of one of the metals lithium, sodium, potassium, magnesium, calcium, zinc, cadmium, boron, or aluminum, and the other component is a transition metal compound, such as a halide or ester of titanium, zirconium, vanadium, or chromium. Other similar catalyst systems can be used as will be apparent to those skilled in the art of producing polyolefins.

The components of the catalyst system are injected individually and successively into the slurry. The catalysts may be diluted with a suitable inert material such as propane, toluene or heptane, in order to increase the accuracy of addition of small amounts of the catalysts and to improve catalyst distribution. The dilution to a 20% by weight concentration is preferred. The concentration of catalyst solution may be as low as 2% catalyst in heptane by weight. The lower concentrations allow for a more rapid flow of catalyst solution into the slurry and more acurate metering of the catalyst. It is preferred that the catalyst solvent be the same material as the conveying fluid; that is, propane is preferably used as the catalyst diluent where propane is the conveying fluid. However, a small amount of different diluent will not disturb the operation of the process. For instance, heptane may be used as the catalyst diluent while propane is used as the conveying fluid. The preferred diluent for a small scale operation is purified heptane.

The first catalyst component may be prepared by charging the catalyst component and the diluent into a feed vessel. Dry nitrogen under pressure may be used to force the charged solution from the feed vessel through a suitable metering device into the catalyst addition header. An excess nitrogen pressure of 100 pounds above that of the header pressure may be maintained in order to insure flow. The second catalyst component may be prepared in the second feed vessel and introduced into the catalyst addition header in a similar manner.

The distance between the introduction of the first and second catalyst components is preferably sufficiently great to provide adequate mixing of the first component with the slurry stream before the second component is added. The mixing takes place rapidly, under some conditions in as little as 3 feet of pipe. Some means of providing turbulent flow, such as sizing pipe to insure turbulent flow conditions, or a Venturi type of mixer, or other type of line mixer, is preferably utilized to assure proper mixing.

The amount of catalyst components added to the stream will depend upon the composition and amount of particulate material in the slurry, the particular catalyst components employed, the monomer to be polymerized, the polymerization temperature and the amount of polymer to be formed as a shell or tube on the individual particles of the particulate material. The addition of too small an amount of the components will result in inadequate treatment of the particulate material, and proper polymerization will not occur. On the other hand, the addition of too large an amount of the components may cause the formation of polymerization initiator sites in the fluid medium of the slurry. If such sites, in an appreciable number, are formed in the fluid medium, polymer will form independent of the particles in the slurry, forming a product entirely different from that contemplated by the instant invention.

With most particulate materials, the order in which the catalyst components are added is not critical. Thus, the first component introduced into the catalyst addition header may be the transition metal compound and the second, the alkyl or aryl derivative, or vice versa. With some particulate material, however, for example cellulose, the order of addition may have some effect on the substrate. With such materials a particular order of addition may be found to be desirable.

As has been pointed out in the aforementioned applications, the molecular properties of the polymer which will be formed with the multi-component catalyst system are, to a large extent, determined by the molar ratio between the components of the system. A 1:1 molar ratio has been found to give most satisfactory results. As is shown in the polymer art, by varying the molar ratio the molecular weight of the polymer formed may be varied. In the instant invention the amount of the respective catalyst components fed into the catalyst addition header should be regulated so that the particulate material in the slurry is treated with the components in substantially this ratio.

Referring again to FIG. 1, the first catalyst supply tank 82 is purged with dry nitrogen through nitrogen purge conduit 84 controlled by nitrogen purge valve 86. The purged nitrogen leaves the first catalyst supply tank through vent conduit 88 controlled by vent valve 90. When the vessel has been thoroughly purged of moisture and oxygen, a liquid diluent is introduced into supply tank 82 through diluent conduit 92 controlled by diluent valve 94, and the first catalyst is charged to supply tank 82 through charge conduit 96 controlled by charge valve 98. When the predetermined amounts of the first catalyst and the diluent are continued in the slurry tank, diluent valve 94 and charge valve 98 are closed, and high pressure nitrogen is introduced through nitrogen conduit 100 controlled by nitrogen valve 102. The pressure of the nitrogen forces the first catalyst solution out of supply tank 82, through discharge conduit 104, into the catalyst addition header 80. The flow through discharge conduit 104 is indicated by flow indicator 106, which may be a rotameter, and is controlled by regulating valve 108.

In a similar manner, the second catalyst supply tank 110 is purged with dry nitrogen through nitrogen purge conduit 112 controlled by nitrogen purge valve 114. The nitrogen purge leaves second catalyst supply tank 110 through vent conduit 116 controlled by vent valve 118. When the vessel has been thoroughly purged of moisture and oxygen, the diluent is introduced through diluent conduit 120 controlled by diluent valve 122, and the second catalyst is introduced through charge conduit 124 controlled by charge valve 126. When the predetermined amounts of the second catalyst and the diluent have been added, the diluent valve 122 and charge valve 126 are closed and high pressure nitrogen is introduced through nitrogen conduit 128 controlled by nitrogen valve 130. The second catalyst solution is forced by the nitrogen pressure from second catalyst supply tank 110, through discharge conduit 132, into the catalyst addition header 80. The amount of the second catalyst entering the catalyst addition header is indicated by flow indicator 134 and controlled by regulating valve 136. The point of addition of the second catalyst is preferably sufficiently removed from the point of addition of the first catalyst in order to permit the thorough mixing of the first catalyst with the particulate-material-containing slurry. The material is preferably treated by the first catalyst before the point of addition of the second catalyst is reached. After the addition of the second catalyst, a sufficient length of header is preferably provided in order to insure thorough mixing of the second catalyst and the slurry and the further treatment of the particulate material by the second catalyst. A spare tank and accessories may be provided for each of the catalyst supply tanks so that one may be in operation while the other is being charged.

In order to obtain the most effective polymerization, a preheating zone is preferably employed immediately after the catalyst addition header to raise the temperature of the slurry prior to the introduction of the olefin. The heating is done preferably by jacketing the pipe for use with a circulating heating medium such as hot water. An alternative heating procedure comprises preheating the slurry tanks to about 20° C. to 65° C., preferably to about 50° C. to 65° C. The conveying fluid may be from ambient temperature up to 65° C. prior to and during the catalyst addition steps.

The preferred reaction temperature range is 20–100° C. depending in part on the reactants used. Where the slurry is cellulose in propane, and the olefin used is ethylene, the optimum operating temperature is 50° C. to 65° C. In any event, in order that the polymer will form as shells or sleeves on the individual particles in the desired manner, the operating temperature should be lower than the softening temperature of the polymer in the particular fluid used.

As shown in FIG. 1, the catalyst addition header 80 passes through reaction heater 138 heated by a heating fluid which enters the heater through heating fluid inlet conduit 140 and leaves through heating fluid discharge conduit 142. After leaving the heater, the slurry passes through conduit 144 to recirculation pump 146.

Any of the aliphatic 1-olefins having fewer than 6 carbon atoms may be polymerized in accordance with our invention. These include the simplest 1-olefins such as ethylene, propylene, butene-1 and the like and also di-olefins such as butadiene-1,3 and isoprene. These 1-olefins may be used to form homopolymers, or mixtures of them may be polymerized together to form various copolymers. In addition, other compounds which are known to copolymerize with these 1-olefins to form useful products may be employed in combination therewith.

For most purposes we prefer to use ethylene or propylene which have the outstanding advantages of being gases at ordinary temperatures, of being relatively inexpensive and available in large quantities, and of producing polymers of high molecular weight having desirable properties. Ethylene or propylene, for instance, may be stored in cylinders at high pressure and measured into the line containing the reaction slurry through a flow indicator. Where the olefin is normally a liquid, the olefin supply tank may be pressurized with a gas, such as nitrogen. The liquid olefin may then be metered into the slurry through a suitable metering device, such as a flow indicator.

As shown in FIG. 1 the 1-olefin supply tank 148 is filled through charge conduit 150 controlled by charge valve 152. The olefin, which must be at a pressure greater than the pressure of the system, is forced from olefin supply tank 148 through discharge conduit 154 into conduit 145 at the inlet of recirculation pump 146. The flow of olefin is indicated by flow indicator 156 and controlled by regulating valve 158. The reaction slurry is circulated by recirculation pump 146 through conduit 160 into the reaction chamber 162. Where a liquid olefin is used supply tank 148 may be pressurized with nitrogen through line 151 controlled by valve 153. To aid in the thorough dispersion of the olefin in the reaction mass, it is preferable to use a recirculation pump which is adapted to receive the olefin directly into its suction side.

The reaction may be carried out in any convenient container which is compatible with the material being reacted. The reaction chamber must be capable of maintaining the reaction slurry in constant agitation so that thorough dispersion of the ethylene in the reaction slurry occurs. The reaction chamber is preferably free of internal constrictions which would trap and hold the solid components of the slurry.

Figure 2:
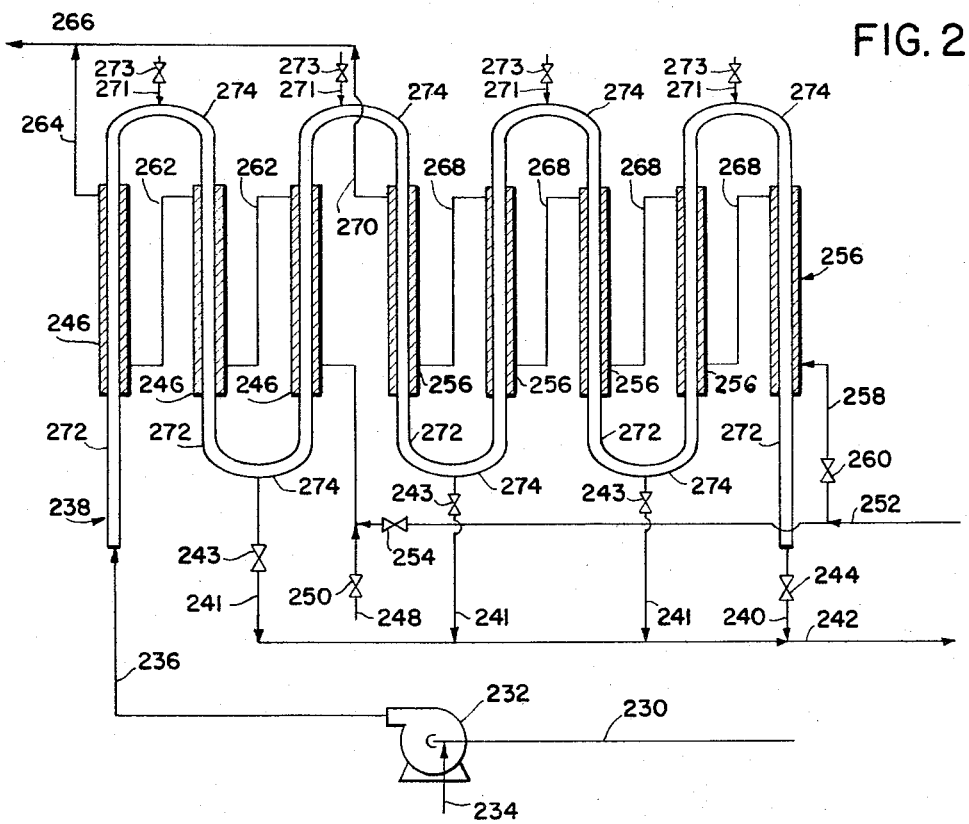
FIG. 2 is a schematic diagram of an alternate embodiment of a reaction chamber which may be substituted in the process of FIG. 1.

The preferred embodiment for the reaction chamber has been found to be a pipe loop. The pipe dimensions are prefarably such that turbulent flow conditions are created. However, laminar flow is operative. The pipe may consist of any number of individual loops as shown in FIG. 2, but preferably consists of a single loop connected to a recirculation pump as shown in FIG. 1. The reaction chamber is not limited to the closed loop system shown in FIG. 1, but may consist of a succession of connected loops or a multi-stage reactor system in which the shape of the loop reactors may be varied. The loop may be of sufficient length to permit the reaction to be carried out in one pass. Preferably, however, about 90% of the reaction slurry in the pipe loop is recycled so that thorough dispersion of the unreacted components occurs. The product may be withdrawn through a tap from the main loop.

As shown in FIG. 1, the reaction chamber 162 is equipped with heating and cooling jacket 164 adapted to receive heating fluids through heating fluid conduit 166 controlled by heating fluid valve 168 and cooling fluids through cooling fluid conduit 170, controlled by cooling fluid valve 172. The heating or cooling fluid enters the jacket 164 through inlet conduit 174 and leaves through discharge conduit 176. The reaction chamber is also equipped with cooling jacket 178 adapted to be cooled by a fluid entering through cooling fluid conduit 180, controlled by cooling fluid valve 182 and leaving through discharge conduit 184. When the reaction slurry is first introduced into the reaction chamber it may be necessary to heat the slurry to initiate the reaction. The heating is accomplished by introducing hot fluids into heating and cooling jacket 164. After initiation, the reaction requires cooling to maintain the reaction temperature within proper limits. Cooling is provided by introducing cooling fluids into cooling jackets 164 and 178 to maintain the temperature of the reactants within such limits. Temperature control may be maintained by introducing heating fluids into one jacket and cooling fluids into the other.

The larger portion of the reaction slurry may be recirculated from the reaction chamber 162 to the recirculating pump 146 through conduit 186. As has been noted above, the purpose of recirculation is to assure completion of the reaction. The reacted product may be removed from the reaction chamber through product conduit 188.

An alternate embodiment of a reaction chamber is shown in FIG. 2. In this embodiment the reaction chamber consists of a series of loops of pipe. Selected portions of the pipe are jacketed and connected into two separate temperature control configurations. The jackets near the inlet may be adapted to be both heated and cooled while the remaining jackets may be adapted to be cooled only. Thus, the first group may be used to raise the temperature of the reaction slurry to the predetermined level. After initiation of the reaction both groups may be used to remove the heat of reaction and maintain the reacting slurry at the proper temperature.

As shown in FIG. 2, the reaction slurry from the reaction heater passes through conduit 230 into the suction side of recirculation pump 232. The olefin is added to conduit 230 through conduit 234. The reaction slurry is discharged from the recirculation pump 232 through conduit 236 into the reaction chamber 238. The reacted product may be removed through conduit 242, the amount of product removed being controlled by valve 244. If desired the product-containing slurry may be removed before it has traversed the full length of reaction chamber 238 through any of intermediate draw-off of conduits 241 controlled by valves 243.

The reaction chamber 238 is equipped with heating and cooling jackets 246 which are adapted to receive heating fluids through conduit 248 controlled by valve 250 and cooling fluids through conduit 252 controlled by valve 254. Successive jackets 246 are connected by conduits 262 and discharged through conduit 264 into header 266. The reaction chamber is also equipped with cooling jackets 256 which are adapted to be cooled by a fluid entering through cooling fluid conduit 258 controlled by valve 260. Successive jackets 256 are connected by conduits 268 and discharged through conduit 270 into header 266.

The reaction chamber 238 may be composed of any desired number of straight segments 272 connected by pipe bends 274. Such a configuration is particularly useful to reduce floor space requirements for reaction chambers having extended length. If desired 1-olefin may be introduced directly into reaction chamber 238 through lines 271 controlled by valves 273.

The loop reactor is of particular advantage because it allows rapid reaction due to the turbulent flow conditions giving maximum dispersion. In a loop reactor efficient heating and cooling may be obtained with jacketed pipes. The loop provides fine control over the cooling rate so that the process reaction rate may be accelerated to maximum levels. A controlling feature of the rate of polymerization is the rate at which heat can be removed from the system. Because heat results from polymerization, a careful control of the addition of the olefin aids in control of the temperature. The reaction rate may be increased to a maximum by a careful balance of the olefin input and the cooling rate. The reaction temperature is preferably maintained between 20° and 100° C. As noted above, the temperature should be maintained below the softening point of the polymer.

The reaction pressure where propane is used as the conveying medium may be in the range of 500 to 600 p.s.i. The fact of operating at such high pressure is an additional advantage to the use of a reactor loop. It is more economical to design a pipeline for high pressures than to design a vessel for the same pressures. An additional advantage of a loop is that the point of entry of the slurry can be isolated from the withdrawal zone so that a minimum of untreated cellulose is removed from the reactor. A further advantage of the loop is that it is adaptable to jacketing and avoids the need for cooling coils within the reactor. Cooling coils may be troublesome because of buildup of fibers on the coils.

Other equipment arrangements which may be substituted in the continuous operation of the instant invention include a vessel reactor where the slurry is pumped into the reactor at the same rate at which the product is withdrawn. Another type of suitable reatcor is a vessel having a side leg wherein the olefin is introduced. Still another embodiment, as described above, is the use of a continuous run of pipe where the reacting slurry is introduced at one end and where olefin is introduced at a series of points along the pipe to yield a fully reacted product at the end of the reaction zone.

As the reacted slurry is withdrawn from the reaction loop, it is desirable to neutralize the catalyst. The neutralization may be carried out by adding ammonia dissolved in a suitable solvent into the product line from the reactor. The ammonia may be added in a solvent, such as propane, in order to provide increased volume as an aid in volumetric control of the quantity of ammonia addition. Only small amounts of the neutralizer are required. For instance, where TiCl$_4$ is employed as one of the catalyst components, 6 moles of ammonia per mole of TiCl$_4$ are provided for neutralization. This is a 50% excess over the stoichiometric requirement and is used to assure complete neutralization.

The ammonia solution may be prepared by charging predetermined amounts of ammonia and solvent into a neutralizer supply tank. The tank may then be pressurized with dry nitrogen forcing the ammonia solution out of the tank through a suitable metering device into the slurry conduit. Where a solvent having a high vapor pressure, such as propane, is used, nitrogen pressurizing may not be necessary. Under turbulent flow conditions, the ammonia neutralizes the catalyst in traveling only a few feet through the conduit.

As shown in FIGURE 1, a catalyst neutralizing solution is introduced into conduit 188 to stop the action of the catalyst. Neutralizer supply tank 190 is charged with a diluent through diluent conduit 192 controlled by diluent valve 194. A predetermined amount of gaseous ammonia is introduced through ammonia conduit 196 controlled by ammonia valve 198. The neutralizer supply tank 190 may be pressurized, where required, to transfer the contents of the tank to the reaction slurry. High pressure nitrogen may be introduced through conduit 200 controlled by nitrogen valve 202. The neutralizer is forced from the neutralizer supply tank 190 through discharge conduit 204 into the reacted slurry in product conduit 188. The flow of neutralizer is indicated by flow indicator 206 and controlled by regulating valve 208. The neutralizing action is essentially instantaneous, requiring only thorough mixing in order to completely neutralize the residual catalyst. A sufficient length of conduit is provided after the point of neutralizer addition in order to assure the complete mixing of the neutralizer with the reacted slurry. It is an advantage of this process that the product is recovered dry and after being slurried with water can go directly to paper making apparatus, where the substrates are fibers.

As an alternate to neutralizing the catalyst in the reactor loop, the dried encapsulated material may be treated with ammonia or any other neutralizer after the carrier fluid has been evaporated. Ammonia may be used to assure complete neutralization of the recycled carrier fluid. When ammonia is used an ammonia scrubber must be placed in line 220 downstream of compressor 218 to carry out the neutralization.

The reacted slurry, after catalyst neutralization, contains a polymer encapsulate on a particulate material substrate dispersed in the liquid conveying fluid. In the preferred embodiment the liquid conveying fluid is propane which has a vapor pressure at the reaction temperature of about 500 p.s.i. As shown in FIGURE 1, the propane is separated from the polymer-coated substrate by passing the slurry through let-down valve 210 into flash chamber 212. The flash chamber 212 is at essentially atmospheric pressure. The liquid conveying medium is immediately vaporized and the dry, polymer-coated, individual particles of the particulate material fall to the bottom of flash chamber 212 and are discharged as product through vane feeder 214 into collection means, not shown. The vaporized conveying fluid passes through conduit 216 into compressor 218 and then through conduit 220 into condenser 222. Condenser 222 is adapted to be cooled by a cooling fluid entering through coolant inlet conduit 224 and leaving through coolant discharge conduit 226. In condenser 222 the vaporized conveying fluid is reliquefied and passes through line 227 into conveying fluid storage tank 228. The conveying fluid may be recycled to fluid header 46 through conduit 229.

Figure 3:
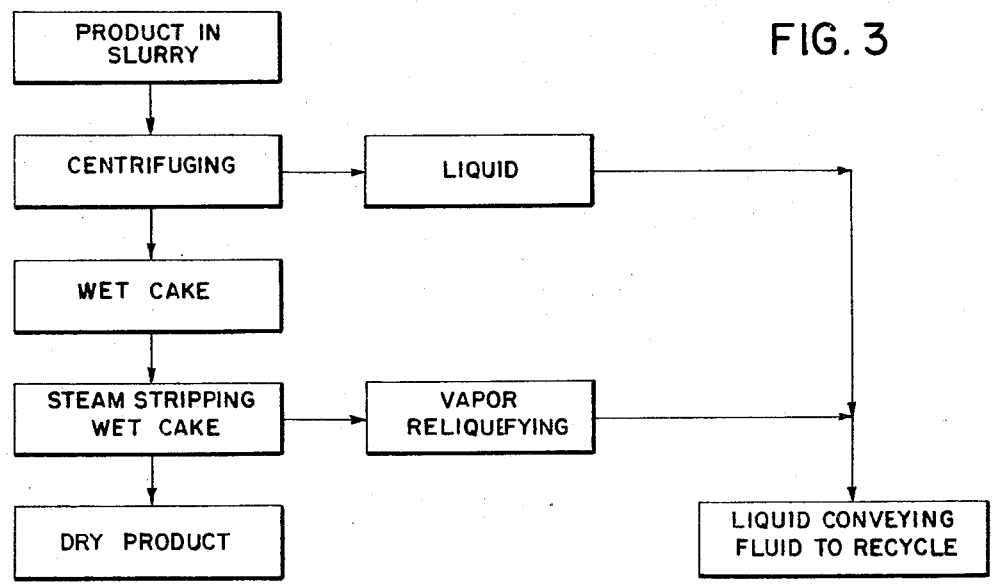
FIG. 3 is a block flow diagram of a portion of the process describing the product recovery steps where a normally liquid medium is used as the conveying fluid.

FIGURE 3 is a block flow diagram describing the product recovery steps where a normally liquid solvent, such as toluene, is used as the conveying fluid. The reaction is carried out at a pressure slightly above atmospheric, where the conveying fluid has too low a vapor pressure to be separated by a flashing technique. The reaction product from the reaction chamber is centrifuged to remove excess toluene, and the wet toluene cake is steam-stripped forming a dry product. During steam stripping, the toluene is vaporized and carried off as a gas. The vaporized toluene is easily reliquified and returned, with the liquid from the centrifuge, to the slurry feed vessel for reuse as the conveying fluid.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A continuous process for encapsulating particulate material with a polymer to form shells of polymer on each individual particle of said particulate material comprising forming a flowable slurry of particulate material preconditioned to remove substantially all water therefrom with a compatible vaporizable conveying fluid flowing through a continuous path with a concentration of said particulate material in said slurry so that, after polymer shells are formed on the particles of said particulate material, the concentration of particles in said slurry is not substantially greater than 15% of the total weight of the slurry, continuously adding a first component of a two component organometallic-transition metal catalyst system, the components of which, upon reaction with each other, provide an initiator effective for polymerizing 1-olefins, to said slurry flowing in said path, contacting said particulate material flowing in said path with said first component, thereafter continuously adding a second component of said catalyst system to said slurry flowing in said path, reacting said first component in contact with said particulate material with said second component, thereafter continuously introducing into the flowing slurry a 1-olefin monomer containing fewer than six carbon atoms and polymerizing said monomer on the individual particles of said particulate material to form said monomer as a polymer shell encapsulating each individual particle of said particulate material flowing in said path separately and independently of the other particles flowing in said path and separate and independent from said conveying fluid, continuously removing said encapsulated particles from said fluid and continuously recycling said conveying fluid through said continuous path by admixing said conveying fluid, after said encapsulated particles are removed, with additional particulate material to form said flowable slurry.

2. A process according to claim 1 wherein said separating step is carried out by vaporizing said conveying fluid whereby said encapsulated individual particles are separated therefrom.

3. A process as in claim 2 wherein said vaporized conveying fluid is reliquefied and recycled.

4. A process as in claim 1 wherein said conveying fluid is propane.

5. A process as in claim 1 wherein said conveying fluid is butane.

6. A process as in claim 1 wherein said conveying fluid is toluene and is separated from the slurry by steam stripping.

7. A process as in claim 1 wherein said 1-olefin monomer is ethylene.

8. A process as in claim 1 wherein said 1-olefin monomer is propylene.

9. A process as in claim 1 wherein said 1-olefin monomer is introduced at a plurality of points.

10. A process as in claim 1 further comprising the step of continuously drying said particulate material before dispersing said material in said conveying fluid.

11. A process as in claim 1 wherein said first component catalyst is a transition metal compound member of the group consisting of halides and esters of titanium, zirconium, vanadium, and chromium, and said second component catalyst is a member of the group consisting of alkyl and aryl derivatives of one of the metals lithium, sodium, potassium, magnesium, calcium, zinc, cadmium, boron and aluminum.

12. A process as in claim 1 wherein said first and second component catalysts are dissolved in an organic solvent prior to addition to said conveying fluid.

13. A process as in claim 1 comprising the further step of continuously adding a catalyst deactivator to the conveying fluid prior to separating said encapsulated material from said conveying fluid.

14. A continuous process for forming a particulate material comprised of individual particles encased in shells of a polymer which comprises the steps of dispersing predried compatible particles in a compatible fluid medium flowing through a continuous path, while flowing said medium and said particles through said path, treating the particles in said medium with first one and then the other of the components of a two component organometallic-transition metal catalyst system the components of which, upon reaction with each other, provide an initiator for polymerizing 1-olefins, after said particles have been treated with said components and while said medium continues to move through said path introducing into said path a monomer of a 1-olefin containing less than six carbon atoms and polymerizing said monomer on the individual particles in said medium to form on said individual particles a polymer shell of said monomer, and thereafter removing said particles having said polymer shells thereon from said fluid medium flowing in said path and recycling said fluid medium through said continuous path by admixing said fluid medium with additional of said compatible particles.

References Cited by the Examiner

UNITED STATES PATENTS

| | | | |
|---|---|---|---|
| 2,881,156 | 4/1959 | Pilar et al. | 260—94.9 |
| 3,008,943 | 11/1961 | Guyer | 260—94.9 |
| 3,008,949 | 11/1961 | Langer | 260—41 |
| 3,092,438 | 6/1963 | Kruger | 260—41 |

FOREIGN PATENTS

| | | |
|---|---|---|
| 549,466 | 1/1957 | Belgium. |
| 566,294 | 11/1957 | Italy. |

MORRIS LIEBMAN, *Primary Examiner.*

K. B. CLARKE, A. LIEBERMAN, *Assistant Examiners.*